US010578338B2

(12) United States Patent
Chen et al.

(10) Patent No.: US 10,578,338 B2
(45) Date of Patent: Mar. 3, 2020

(54) CORDLESS LIQUID HEATING DEVICE

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Weijie Chen, Foshan (CN); Guojun Zhu, Foshan (CN)

(*) Notice: Subject to any disclaimer, the term of this patent is extended or adjusted under 35 U.S.C. 154(b) by 0 days.

(21) Appl. No.: 15/578,711

(22) PCT Filed: May 31, 2016

(86) PCT No.: PCT/CN2016/084161
§ 371 (c)(1),
(2) Date: Dec. 1, 2017

(87) PCT Pub. No.: WO2017/080186
PCT Pub. Date: May 18, 2017

(65) Prior Publication Data
US 2018/0313576 A1 Nov. 1, 2018

(30) Foreign Application Priority Data

Nov. 9, 2015 (CN) .......................... 2015 1 0762178
Nov. 9, 2015 (CN) ...................... 2015 2 0892320 U

(51) Int. Cl.
*F24H 1/18* (2006.01)
*H01R 24/66* (2011.01)
(Continued)

(52) U.S. Cl.
CPC .......... *F24H 1/185* (2013.01); *A47J 27/2105* (2013.01); *H01R 24/66* (2013.01); *H01R 33/94* (2013.01)

(58) Field of Classification Search
CPC ..................................................... F24H 1/185
See application file for complete search history.

(56) References Cited

U.S. PATENT DOCUMENTS 6,080,968 A * 6/2000 Taylor ............... A47J 27/21041
219/432
6,241,559 B1 * 6/2001 Taylor ................. A47J 27/2105
439/675

(Continued)

FOREIGN PATENT DOCUMENTS

CN          1592500 A      3/2005
CN        104039203 A      9/2014

(Continued)

OTHER PUBLICATIONS

Korean Office Action, Notification for Reason for Refusal for Appln No. 10-2017-7034439 dated Nov. 19, 2018, all pages.

(Continued)

*Primary Examiner* — Nathaniel Herzfeld
(74) *Attorney, Agent, or Firm* — Kilpatrick Townsend & Stockton, LLP

(57) ABSTRACT

A cordless liquid heating device (1000) is provided and includes an implement part (100) and a base part (200). The implement part (100) includes a liquid heating container and a temperature measuring device (110); the base part (200) is configured to supply electric energy to the implement part (100) through a cordless electric connector, the cordless electric connector achieves an electric connection when the implement part (100) is placed on the base part (200); the base part (200) includes an electronic control device configured to control an electric heater and a signal electric connection configured to transmit a temperature measured by the temperature measuring device (110) to the electronic control device in the base part (200); the signal electric connection and the cordless electric connector are separate components. The cordless liquid heating device (1000) facilitates maintenance thereof.

24 Claims, 10 Drawing Sheets

(51) Int. Cl.
*H01R 33/94* (2006.01)
*A47J 27/21* (2006.01)

(56) References Cited

U.S. PATENT DOCUMENTS

| | | | |
|---|---|---|---|
| 9,259,113 B2 * | 2/2016 | Howitt | A47J 27/2105 |
| 2009/0302025 A1 * | 12/2009 | Corkin | A47J 27/21041 |
| | | | 219/445.1 |
| 2010/0018403 A1 * | 1/2010 | Hoare | A47J 31/0615 |
| | | | 99/281 |
| 2010/0270284 A1 * | 10/2010 | Cohen | A47J 27/21175 |
| | | | 219/429 |
| 2014/0295678 A1 * | 10/2014 | Garvey | A47J 27/2105 |
| | | | 439/11 |

FOREIGN PATENT DOCUMENTS

| | | |
|---|---|---|
| CN | 204535053 U | 8/2015 |
| CN | 204535054 U | 8/2015 |
| CN | 204535055 U | 8/2015 |
| CN | 205403128 U | 7/2016 |
| EP | 1858297 A1 | 11/2007 |
| GB | 2387765 A | 10/2003 |
| WO | 2013093526 A1 | 6/2013 |

OTHER PUBLICATIONS

European Office Action dated Feb. 11, 2019 in the corresponding EP application (application No. 16863367.5).

\* cited by examiner

CORDLESS LIQUID HEATING DEVICE

CROSS-REFERENCE TO RELATED APPLICATION

The present application is a national phase entry under 35 USC § 371 of International Application PCT/CN2016/084161, filed May 31, 2016, which claims the benefit of and priority to Chinese Patent Application No. 201510762178.4 and 201520892320.2, filed Nov. 9, 2015, the entire disclosure of which is incorporated herein by reference.

FIELD

The present disclosure relates to a field of household appliances, more particularly to a cordless liquid heating device.

BACKGROUND

In the related art, a cordless electric connection part and a cordless signal connection part of a cordless liquid heating device have an integrated structure. When one of the cordless electric connection part and the cordless signal connection part goes wrong, the whole structure is required to be replaced, which is not conducive to maintenance of the cordless liquid heating device, and results in high maintenance cost.

SUMMARY

The present disclosure seeks to solve at least one of the problems existing in the related art to at least some extent. Thus, the present disclosure proposes a cordless liquid heating device, a transmission path of a temperature signal and a transmission path of electric energy of the cordless liquid heating device are separated, such that maintenance of the cordless liquid heating device can be facilitated when the cordless liquid heating device is damaged.

The cordless liquid heating device according to the present disclosure includes an implement part including a liquid heating container and a temperature measuring device, the liquid heating container including a container configured to contain liquid and an electric heater configured to heat the liquid; a base part configured to supply electric energy to the electric heater of the implement part through a cordless electric connector, the cordless electric connector achieving an electric connection when the implement part is placed on the base part regardless of a relative angle relation between the implement part and the base part, the base part including an electronic control device configured to control the electric heater; and a signal electric connection configured to transmit a temperature measured by the temperature measuring device to the electronic control device in the base part, so as to make the electronic control device operate in response to a measured value; the signal electric connection and the cordless electric connector that is configured to transmit the electric energy to the electric heater are separate components; the signal electric connection includes a cordless upper signal-transmission connector disposed to a bottom of the implement part and a cordless lower signal-transmission connector disposed to the base part, and the cordless upper signal-transmission connector and the cordless lower signal-transmission connector define the signal electric connection.

In the cordless liquid heating device according to the present disclosure, the transmission path of the electric energy and the transmission path of the signal are separated, when one of the cordless electric connector and the signal electric connection goes wrong, only a corresponding device may be maintained, thereby facilitating the maintenance of the cordless liquid heating device, and reducing the maintenance cost.

According to one embodiment of the present disclosure, the cordless upper signal-transmission connector includes a first conductive part and a second conductive part; the temperature measuring device is electrically connected to the first conductive part and the second conductive part through a circuit separately; the cordless lower signal-transmission connector includes a third conductive part fitted with the first conductive part and a fourth conductive part fitted with the second conductive part; the third conductive part abuts against the first conductive part, and the fourth conductive part abuts against the second conductive part, when the cordless upper signal-transmission connector is connected to the cordless lower signal-transmission connector.

According to one embodiment of the present disclosure, the cordless upper signal-transmission connector is provided with a first signal terminal and a second signal terminal, the first signal terminal is connected to the temperature measuring device and the first conductive part separately, and the second signal terminal is connected to the temperature measuring device and the second conductive part separately.

According to one embodiment of the present disclosure, the implement part further includes a kettle body bottom cover, and the cordless upper signal-transmission connector is fixed on the kettle body bottom cover in a snap-fit manner.

According to one embodiment of the present disclosure, one of the kettle body bottom cover and the cordless upper signal-transmission connector is provided with a snap, the other of the kettle body bottom cover and the cordless upper signal-transmission connector is provided with a snap groove, and the snap is fitted with the snap groove to fix the cordless upper signal-transmission connector on the kettle body bottom cover in the snap-fit manner.

According to one embodiment of the present disclosure, the cordless lower signal-transmission connector is provided with a third signal terminal and a fourth signal terminal, the third signal terminal is connected to the third conductive part and the electronic control device separately, and the fourth signal terminal is connected to the fourth conductive part and the electronic control device separately.

According to one embodiment of the present disclosure, the base part includes a base seat and a fixed seat, and the cordless lower signal-transmission connector is fixed on the base seat through the fixed seat.

According to one embodiment of the present disclosure, an insulating layer is provided between the first conductive part and the second conductive part, and a length of the insulating layer is greater than a length of the first conductive part and a length of the second conductive part, separately.

According to one embodiment of the present disclosure, a minimum distance between the first conductive part and the second conductive part is L1, a thickness of the insulating layer is L2, and the L1 satisfies: $L1 \geq 3.6$ mm, the L2 satisfies: $L2 \geq 0.8$ mm.

According to one embodiment of the present disclosure, the first conductive part is spaced apart from the second conductive part.

According to one embodiment of the present disclosure, the third conductive part has a first protrusion part, and the fourth conductive part has a second protrusion part.

According to one embodiment of the present disclosure, the cordless electric connector configured to transmit the electric energy to the electric heater includes a cordless upper connector disposed to the implement part, and a cordless lower connector disposed to the base part, and the cordless upper connector and the cordless lower connector define the cordless electric connector.

According to one embodiment of the present disclosure, the cordless lower signal-transmission connector further includes a first supporting frame, the third conductive part and the second conductive part are disposed to the first supporting frame separately, a distance between an inner circumferential wall of the first supporting frame and an outer circumferential wall of the cordless lower connector is L3, and the L3 satisfies: 0.5 mm≤L3≤3 mm.

According to one embodiment of the present disclosure, the L2 and L3 satisfies: 0≤L3/L2≤3.75.

According to one embodiment of the present disclosure, a distance between a top point of a portion of the fourth conductive part placed between the inner circumferential wall of the first supporting frame and the outer circumferential wall of the cordless lower connector and an upper end surface of the first supporting frame is L4, a distance between a top point of a portion of the third conductive part placed between the inner circumferential wall of the first supporting frame and the outer circumferential wall of the cordless lower connector and the upper end surface of the first supporting frame is L5, and the L4 satisfies: L4≥3 mm, the L5 satisfies: L5≥3 mm.

According to one embodiment of the present disclosure, the L3 and L4 satisfies: 0≤L3/L4≤1, and the L3 and L5 satisfies: 0≤L3/L5≤1.

According to one embodiment of the present disclosure, the L3 and L4 satisfies: 0.25≤L3/L4≤1, and the L3 and L5 satisfies: 0.25≤L3/L5≤1.

According to one embodiment of the present disclosure, the implement part includes a kettle body assembly, and the cordless upper connector is fixed on the kettle body assembly by a threaded fastener.

According to one embodiment of the present disclosure, a plurality of clearance notches is defined in the cordless upper connector, such that the first signal terminal, the second signal terminal and the snap can be avoided when the cordless upper signal-transmission connector approaches the cordless upper connector.

According to one embodiment of the present disclosure, the cordless lower connector is fixed on the base seat through the fixed seat.

According to one embodiment of the present disclosure, the electric heater is a heating tube or a thick film heater.

According to one embodiment of the present disclosure, the implement part further includes a power adjusting device connected to the electric heater.

According to one embodiment of the present disclosure, the power adjusting device is a triac.

According to one embodiment of the present disclosure, the implement part further includes a user interface connected to the electronic control device.

According to one embodiment of the present disclosure, an outer circumferential wall of the cordless lower signal-transmission connector is provided with a boss, a bottom wall of the boss abuts against a top wall of the base part when the implement part is fitted with the base part.

According to one embodiment of the present disclosure, the cordless upper connector includes three upper conductive parts, and the cordless lower connector includes three lower conductive parts fitted with the three upper conductive parts in one-to-one correspondence.

According to one embodiment of the present disclosure, the three upper conductive parts are a columnar first fitting part, an annular second fitting part and an annular third fitting part, and the corresponding three lower conductive parts are a fourth fitting part, a fifth fitting part and a sixth fitting part; the cordless lower connector further includes a second supporting frame, the three lower conductive parts are disposed to the second supporting frame, a distance between a top surface of the fifth fitting part and a top surface of the second supporting frame is L6, a distance between a top surface of the sixth fitting part and the top surface of the second supporting frame is L7, and the L6 satisfies: L6≥3 mm, the L7 satisfies: L7≥3 mm.

According to one embodiment of the present disclosure, a height of a portion of the first protrusion part in contact with the first conductive part is greater than a height of the fifth fitting part and a height of the sixth fitting part separately, and a height of a lower end of the first conductive part is not less than a height of a lower end of the second fitting part and a height of a lower end of the third fitting part; a height of a portion of the second protrusion part in contact with the second conductive part is greater than the height of the fifth fitting part and the height of the sixth fitting part separately, and a height of a lower end of the second conductive part is not less than the height of the lower end of the second fitting part and the height of the lower end of the third fitting part.

According to one embodiment of the present disclosure, the temperature measuring device is a thermal sensor.

According to one embodiment of the present disclosure, the implement part is rotatable relative to the base part when the implement part is placed on the base part.

Additional aspects and advantages of embodiments of present invention will be given in part in the following descriptions, become apparent in part from the following descriptions, or be learned from the practice of the embodiments of the present invention.

Figure 1:
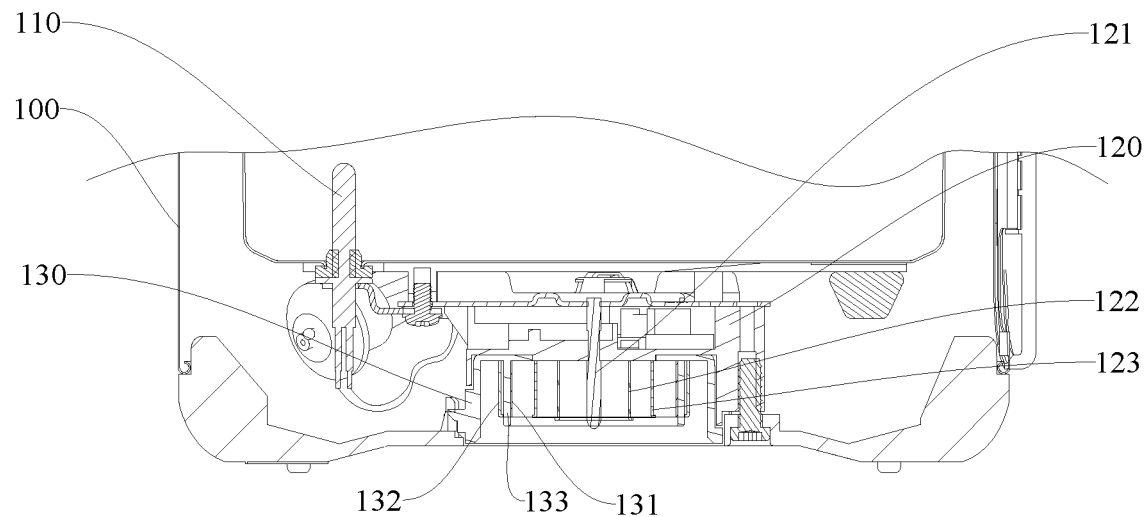
FIG. 1 is a schematic view of an implement part and a base part according to an embodiment of the present disclosure, in which the implement part is separated from the base part.
Figure 1:
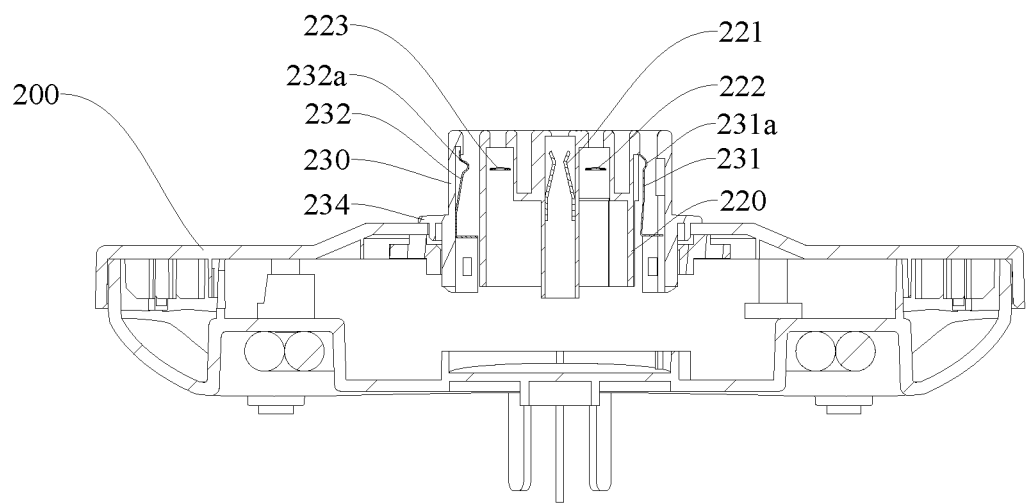
Figure 2:
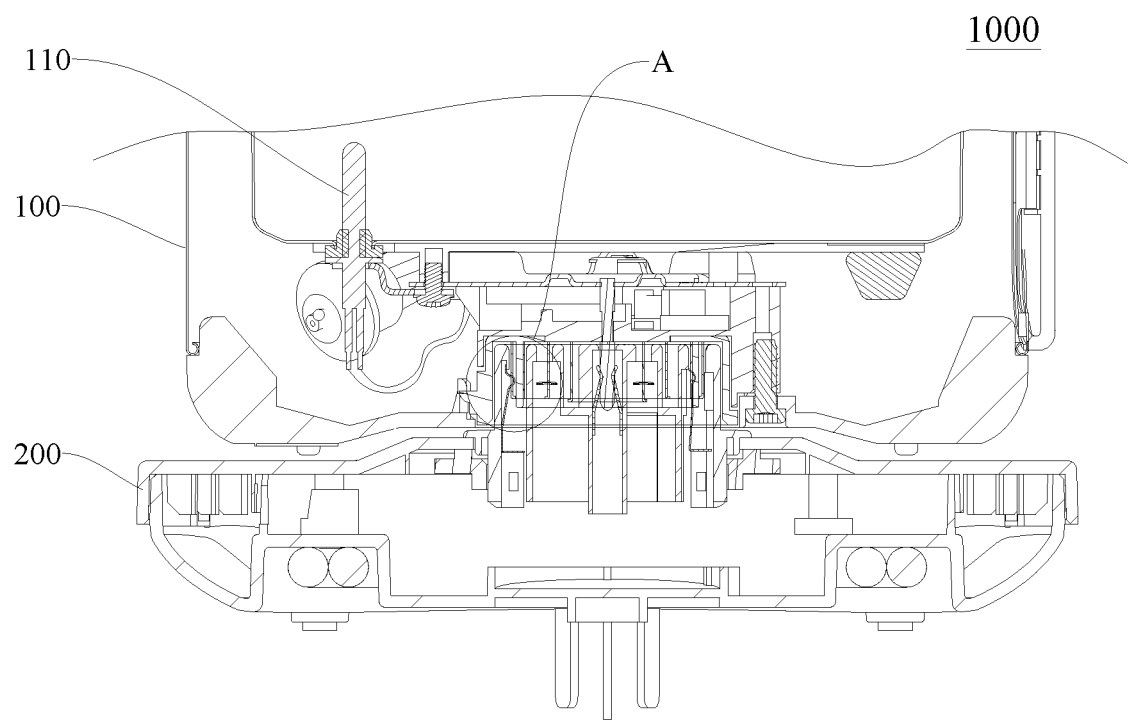
FIG. 2 is a schematic view of an implement part and a base part according to an embodiment of the present disclosure, in which the implement part is fitted with the base part.

REFERENCE NUMERALS cordless liquid heating device 1000;
implement part 100; temperature measuring device 110;
cordless upper connector 120; first fitting part 121; second fitting part 122; third fitting part 123;
cordless upper signal-transmission connector 130; first conductive part 131; second conductive part 132; insulating layer 133; first signal terminal 134; second signal terminal 135;
kettle body bottom cover 140; kettle body assembly 150; first supporting frame 160;
base part 200;
cordless lower connector 220; fourth fitting part 221; fifth fitting part 222; sixth fitting part 223; cordless lower signal transmission connector 230; third conductive part 231; first protrusion part 231a; fourth conductive part 232; second protrusion part 232a; boss 234; third signal terminal 235; fourth signal terminal 236;
fixed seat 240; base seat 250; second supporting frame 260.

DETAILED DESCRIPTION

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means two or more than two, unless specified otherwise. In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

A cordless liquid heating device 1000 according to embodiments of the present disclosure will be described in detail with reference to FIGS. 1 to 21, and the cordless liquid heating device 1000 may be household appliances such as a kettle, a coffee pot or the like.

The cordless liquid heating device 1000 according to embodiments of the present disclosure may include an implement part 100 and a base part 200. The implement part 100 is fitted with the base part 200 to transmit electric energy from the base part 200 to the implement part 100. The implement part 100 is rotatable relative to the base part 200 when the implement part 100 is place on the base part 200.

As illustrated in FIG. 1, the implement part 100 may include a liquid heating container and a temperature measuring device 110.

The liquid heating container includes a container for containing liquid (such as water, coffee, soybean milk or the like) and an electric heater for heating the liquid. The electric heater can heat the container after the liquid is contained in the container, such that the liquid in the container can be heated.

In one embodiment, the electric heater may be a heating tube or a thick film heater. In a specific example of the present disclosure, the electric heater is the heating tube.

The temperature measuring device 110 is disposed to the liquid heating container to measure a temperature of the liquid in the container. In one embodiment, the temperature measuring device 110 is a thermistor.

The base part 200 is configured to supply the electric energy to the electric heater of the implement part 100 through a cordless electric connector. The implement part 100 is rotatably disposed on the base part 200, that is to say, the cordless electric connector achieves an electric connection when the implement part 100 is placed on the base part 200 regardless of a relative angle relation between the implement part 100 and the base part 200. The base part 200 includes an electronic control device configured to control the electric heater. The cordless electric connector supplies the electric energy to the implement part 100 when the implement part 100 is placed on the base part 200 regardless of the relative angle relation between the implement part 100 and the base part 200, and the electronic control device controls a working state of the electric heater.

A signal electric connection is configured to transmit a temperature measured by the temperature measuring device 110 to the electronic control device in the base part 200, such that the electronic control device can operate in response to a measured value. In other words, the signal electric connection transmits the temperature measured by the temperature measuring device 110 to the electronic control device when the implement part 100 is placed on the base part 200, and the electronic control device controls the working state of the cordless liquid heating device 1000 according to a measured temperature value, for example, controlling the working state of the electric heater.

The signal electric connection and the cordless electric connector configured to transmit the electric energy to the electric heater are separate components. That is to say, the signal electric connection and the cordless electric connector are non-integral members.

In other words, the cordless electric connector supplies the electric energy to the implement part 100 when the implement part 100 is placed on the base part 200, and the electric heater can heat the liquid in the container. During heating, the temperature measuring device 110 measures the temperature of the liquid in the container, the signal electric connection transmits the temperature measured by the temperature measuring device 110 to the electronic control device, and the electronic control device controls the working state of the cordless liquid heating device 1000 according to the measured temperature value.

The electronic control device may include a microprocessor and a power source module, and is a control center of the cordless liquid heating device 1000; the temperature signal measured by the temperature measuring device 110 is transmitted to the electronic control device through the signal electric connection; and the electronic control device controls the working state of the cordless liquid heating device 1000 according to the temperature signal measured. In a specific example of the present disclosure, a temperature can be set in the electronic control device in advance, and the electronic control device can control the electric heater to stop heating when the temperature in the container measured by the temperature measuring device reaches the set temperature.

Specifically, as illustrated in FIG. 1, the implement part 100 includes a cordless upper signal-transmission connector 130, the base part 200 includes a cordless lower signal-transmission connector 230, and the cordless upper signal-transmission connector 130 and the cordless lower signal-transmission connector 230 define the signal electric connection. That is to say, the cordless upper signal-transmission connector 130 is fitted with the cordless lower signal-transmission connector 230 to transmit the temperature measured by the temperature measuring device 110 to the electronic control device when the implement part 100 is placed on the base part 200.

In the cordless liquid heating device 1000 according to the present disclosure, since the signal electric connection and the cordless electric connector are separate components, a transmission path of the electric energy and a transmission path of the signal are separated, and when one of the cordless electric connector and the signal electric connection goes wrong, only a corresponding device may be maintained, thereby facilitating the maintenance of the cordless liquid heating device 1000, and reducing the maintenance cost.

In some embodiments of the present disclosure, as illustrated in FIG. 1, the cordless upper signal-transmission connector 130 includes a first conductive part 131 and a second conductive part 132, and the temperature measuring device 110 is connected to the first conductive part 131 and the second conductive part 132 through a circuit separately. The cordless lower signal-transmission connector 230 includes a third conductive part 231 fitted with the first conductive part 131 and a fourth conductive part 232 fitted with the second conductive part 132, and when the cordless upper signal-transmission connector 130 is connected to the cordless lower signal-transmission connector 230, the third conductive part 231 abuts against the first conductive part 131 and the fourth conductive part 232 abuts against the second conductive part 132.

Specifically, the first conductive part 131 and the third conductive part 231 are fitted in a form of a protrusion and a groove, and the second conductive part 132 and the fourth conductive part 232 are fitted in a form of a protrusion and a groove.

Figure 6:
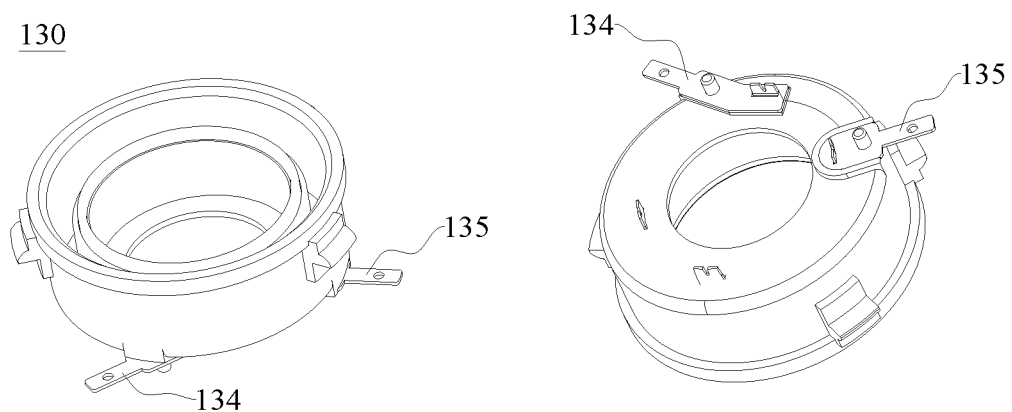
FIG. 6 is a schematic view of a cordless upper signal-transmission connector according to an embodiment of the present disclosure.

According to some embodiments of the present disclosure, as illustrated in FIG. 6, the cordless upper signal-transmission connector 130 is provided with a first signal terminal 134 and a second signal terminal 135, the first signal terminal 134 is connected to the temperature measuring device 110 and the first conductive part 131 separately, and the second signal terminal 135 is connected to the temperature measuring device 110 and the second conductive part 132 separately.

The temperature signal measured by the temperature measuring device 110 can be transmitted to the electronic control device of the base part 200 through the first signal terminal 134, the second signal terminal 135, the first conductive part 131 and the second conductive part 132 so as to achieve control over the temperature of the liquid in the heating container.

Figure 7:
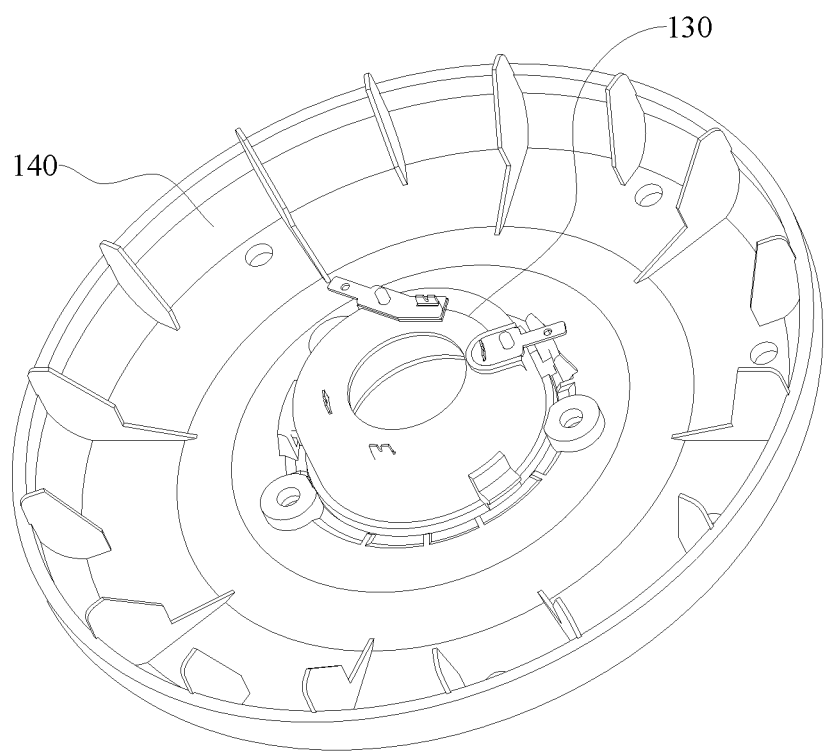
FIG. 7 is a schematic view of a cordless upper signal-transmission connector and a kettle body bottom cover according to an embodiment of the present invention, in which the cordless upper signal-transmission connector is fitted with the kettle body bottom cover.
Figure 8:
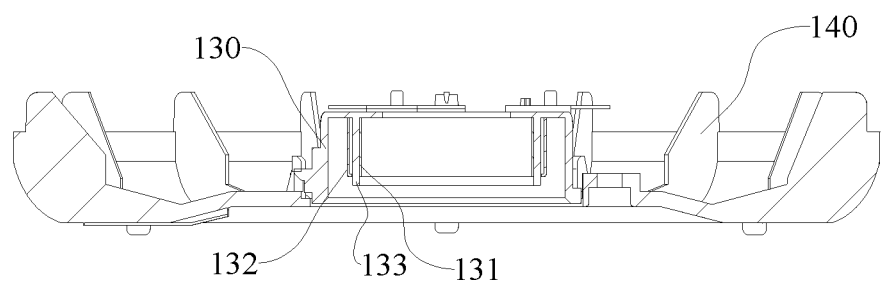
FIG. 8 is a sectional view of a cordless upper signal-transmission connector and a kettle body bottom cover according to an embodiment of the present invention, in which the cordless upper signal-transmission connector is fitted with the kettle body bottom cover.

As illustrated in FIGS. 7 and 8, the implement part 100 includes a kettle body bottom cover 140, and the cordless upper signal-transmission connector 130 is fixed on the kettle body bottom cover 140 in a snap-fit manner.

Specifically, one of the kettle body bottom cover 140 and the cordless upper signal-transmission connector 130 is provided with a snap, the other of the kettle body bottom cover 140 and the cordless upper signal-transmission connector 130 is provided with a snap groove, and the snap is fitted with the snap groove to fix the cordless upper signal-transmission connector 130 on the kettle body bottom cover 140.

In a specific example of the present disclosure, as illustrated in FIGS. 7 and 8, a plurality of snaps and a plurality of snap grooves are provided, and the plurality of snaps are disposed to the cordless upper signal-transmission connector 130, and the plurality of snap grooves are correspondingly defined in the kettle body bottom cover 140. It should be understood that, the plurality of snaps may also be disposed to the kettle body bottom cover 140, and the plurality of snap grooves may be correspondingly disposed in the cordless upper signal-transmission connector 130.

Figure 12:
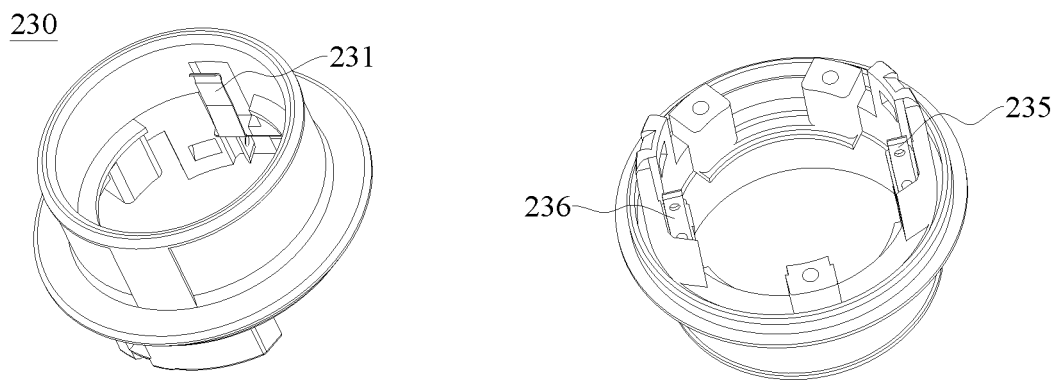
FIG. 12 is a schematic view of a cordless lower signal-transmission connector according to an embodiment of the present disclosure.

Further, as illustrated in FIG. 12, the cordless lower signal-transmission connector 230 includes a third signal terminal 235 and a fourth signal terminal 236, the third signal terminal 235 is connected to the third conductive part 231 and the electronic control device separately, and the fourth signal terminal 236 is connected to the fourth conductive part 232 and the electronic control device separately.

The temperature signal transmitted from the cordless upper signal-transmission connector 130 can be transmitted to the electronic control device through the third signal terminal 235, the fourth signal terminal 236, the third conductive part 231 and the fourth conductive part 232.

Figure 13:
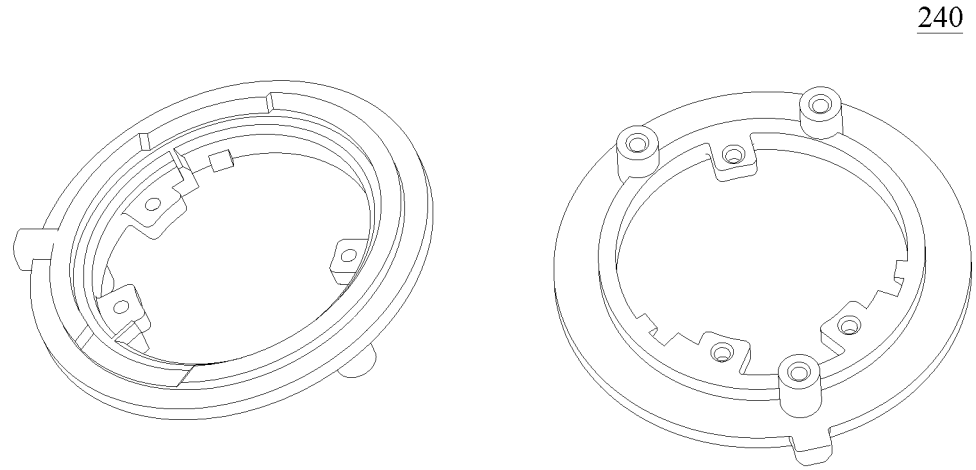
FIG. 13 is a schematic view of a fixed seat according to an embodiment of the present disclosure.
Figure 14:
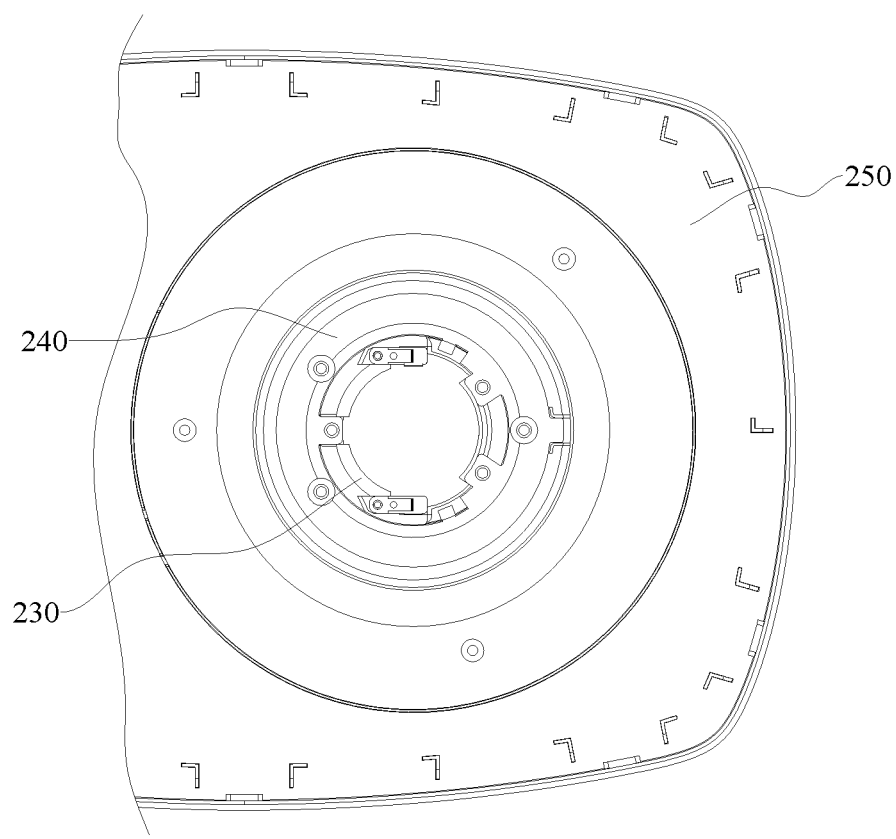
FIG. 14 is a schematic view of a cordless lower signal-transmission connector, a fixed seat and a base seat according to an embodiment of the present disclosure, in which the cordless lower signal-transmission connector, the fixed seat and the base seat are fitted.
Figure 15:
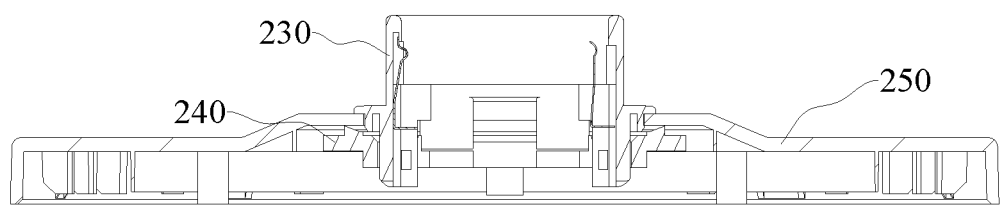
FIG. 15 is a sectional view of a cordless lower signal-transmission connector, a fixed seat and a base seat according to an embodiment of the present disclosure, in which the cordless lower signal-transmission connector, the fixed seat and the base seat are fitted.

Moreover, as illustrated in FIGS. 13 to 15, the base part 200 includes a base seat 250 and a fixed seat 240, and the cordless lower signal-transmission connector 230 is fixed on the base seat 250 through the fixed seat 240. The cordless lower signal-transmission connector 230, the base seat 250 and the fixed seat 250 can be fixed to one another by a threaded fastener.

Figure 11:
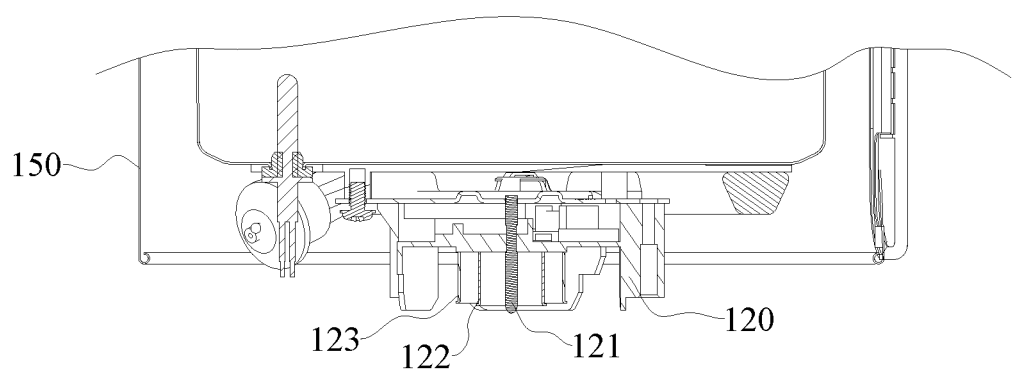
FIG. 11 is a sectional view of a cordless upper connector and a kettle body assembly according to an embodiment of the present invention, in which the cordless upper connector is fitted with the kettle body assembly.

In some embodiments of the present disclosure, as illustrated in FIGS. 1 and 11, an insulating layer 133 is disposed between the first conductive part 131 and the second conductive part 132, and a length of the insulating layer 133 is greater than a length of the first conductive part 131 and a length of the second conductive part 132 separately. Thus, a creepage distance between the first conductive part 131 and the second conductive part 132 can be satisfied, and space occupation of the first conductive part 131 and the second conductive part 132 can be reduced.

Figure 19:
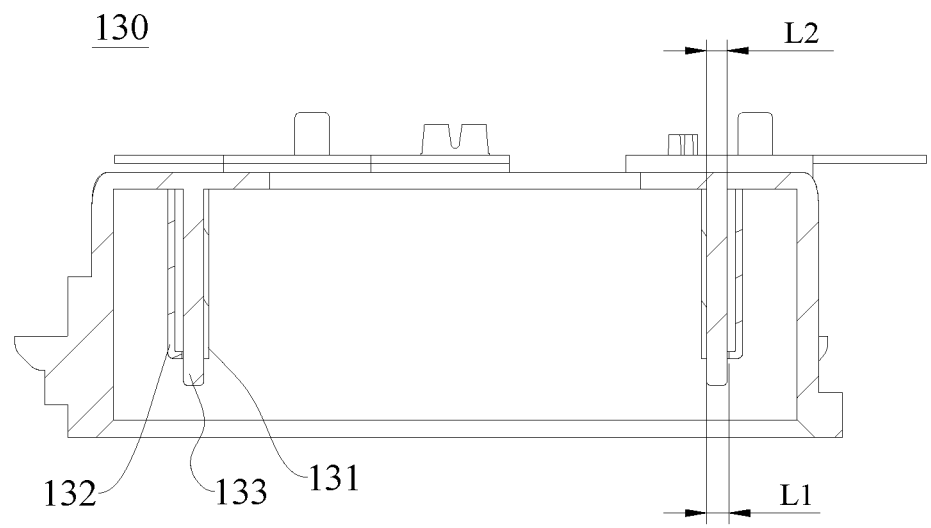
FIG. 19 is a sectional view of a cordless upper connector according to an embodiment of the present disclosure.

Specifically, as illustrated in FIG. 19, a minimum distance between the first conductive part 131 and the second conductive part is L1, a thickness of the insulating layer is L2, and the L1 satisfies: L1≥3.6 mm. Thus, a certain creepage distance is present between the first conductive part 131 and the second conductive part 132, the first conductive part 131 and the second conductive part 132 are less likely to generate a phenomenon of arcing or communication, such that the temperature signal can be ensured to be transmitted, and operational stability of the cordless liquid heating device 1000 can be improved.

The L2 satisfies: L2≥0.8 mm, the thickness of the insulating layer has to be greater than a certain dimension, otherwise bad phenomena may occur during processing, such as breakage, damage, and so on.

In one embodiment, the first conductive part 131 is spaced apart from the second conductive part 132. Since the insulating layer 133 is not present between the first conductive part 131 and the second conductive part 132, and instead the creepage distance is ensured only by a special gap, a large interval space is necessary between the first conductive part 131 and the second conductive part 132. In some embodiments of the present disclosure, a distance between the first conductive part 131 and the second conductive part 132 is h, and h>3.6 mm.

Meanwhile, the fourth conductive part 232 can be placed at an outer side of the cordless lower signal-transmission connector 230 in order to ensure that a size of the cordless lower signal-transmission connector 230 is not overlarge.

Figure 3:
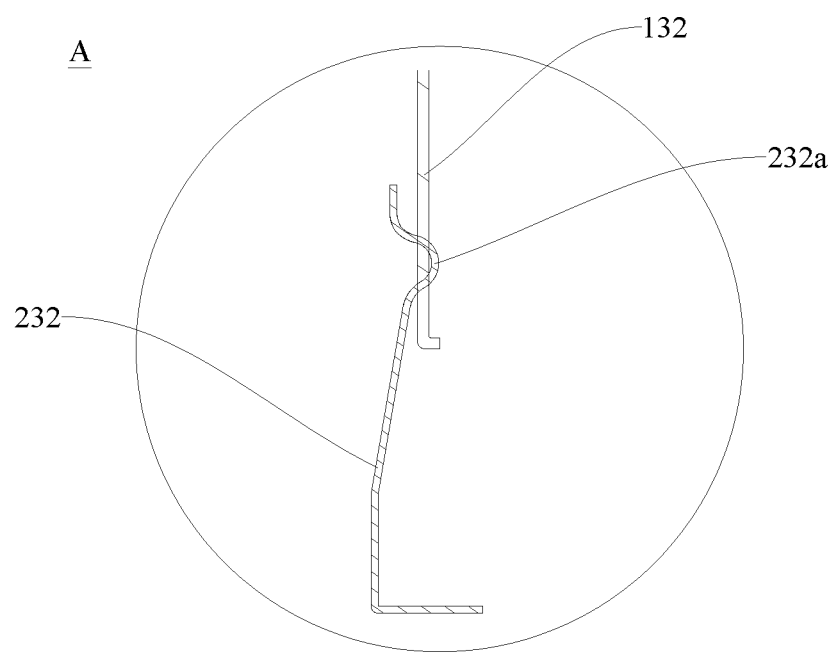
FIG. 3 is a partially enlarged view of part A in FIG. 2.
Figure 4:
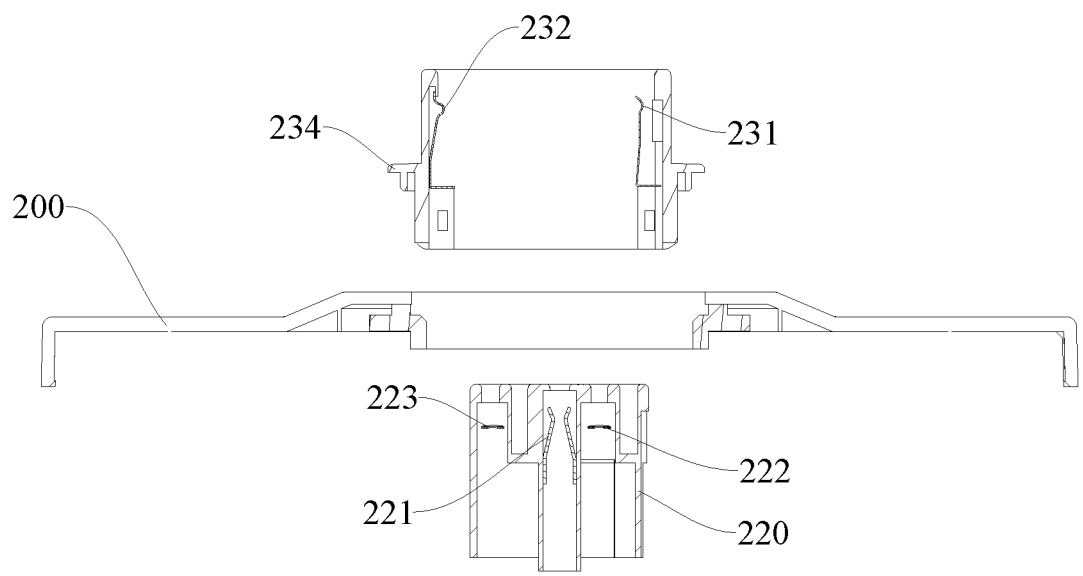
FIG. 4 is an exploded view of a base part according to an embodiment of the present disclosure.
Figure 5:
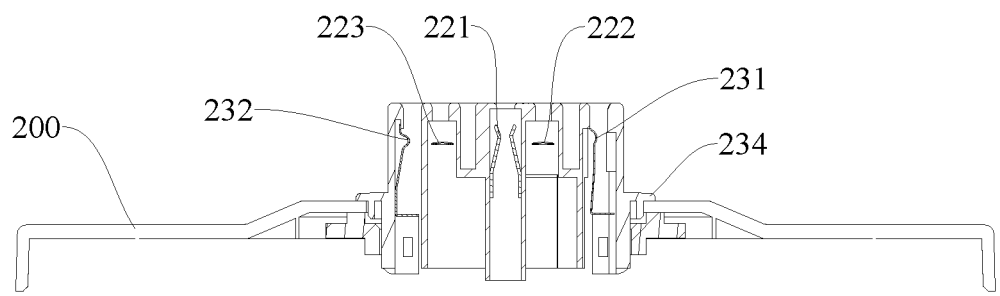
FIG. 5 is a schematic view of a base part according to an embodiment of the present disclosure.

In some embodiments of the present disclosure, as illustrated in FIGS. 1 and 3, the third conductive part 231 has a first protrusion part 231a protruding in a direction away from a center of the cordless lower signal-transmission connector 230; the fourth conductive part 232 has a second protrusion part 232a protruding in a direction close to the center of the cordless lower signal-transmission connector 230. The first protrusion part 231a abuts against the first conductive part 131, and the second protrusion part 232a abuts against the second conductive part 132, when the implement part 100 is fitted with the base part 200, thereby achieving transmission of the temperature signal.

In one embodiment, the third conductive part 231 and the fourth conductive part 232 may be an elastic piece, the first protrusion part 231a of the third conductive part 231 elastically abuts against the first conductive part 131, and the second protrusion part 232a of the fourth conductive part 232 elastically abuts against the second conductive part 132.

Figure 9:
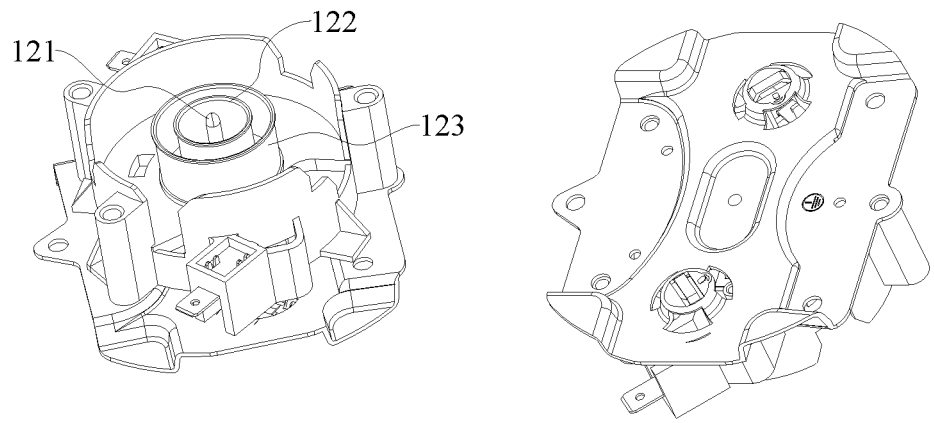
FIG. 9 is a schematic view of a cordless upper connector according to an embodiment of the present disclosure.
Figure 16:
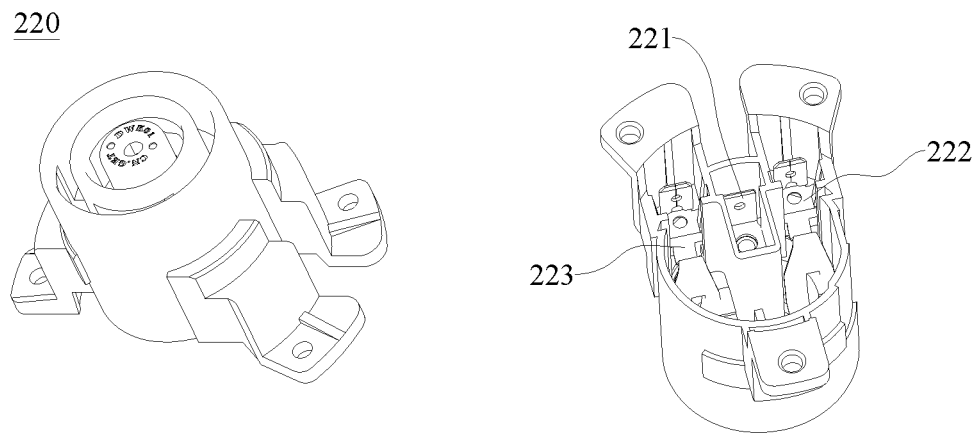
FIG. 16 is a schematic view of a cordless lower connector according to an embodiment of the present disclosure.

As illustrated in FIGS. 1, 9 and 16, the implement part 100 includes a cordless upper connector 120, the base part 200 includes a cordless lower connector 220, and the cordless upper connector 120 and the cordless lower connector 220 define the cordless electric connector. The cordless upper connector 120 is fitted with the cordless lower connector 220 to transmit the electric energy to implement part 100 when the implement part 100 is placed on the base part 200.

Figure 20:
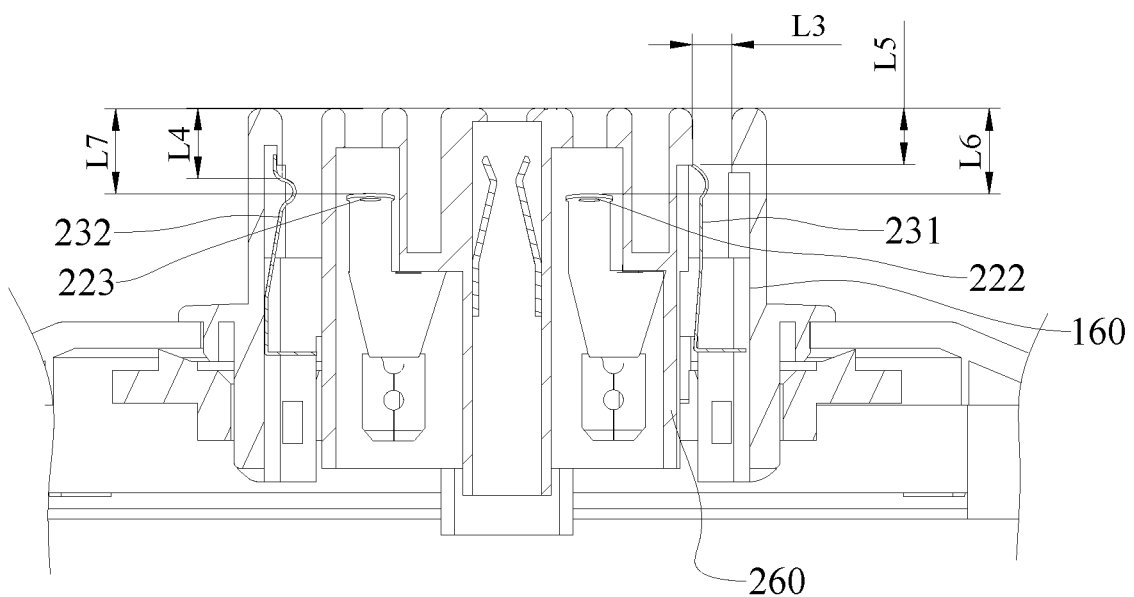
FIG. 20 is a schematic view of a cordless upper connector and a cordless upper signal transmission connector according to an embodiment of the present disclosure.

As illustrated in FIG. 20, the cordless lower signal-transmission connector 230 further includes a first supporting frame 160, the third conductive part 231 and the fourth conductive part 232 are disposed to the first supporting frame 160 separately, a distance between an inner circumferential wall of the first supporting frame 160 and an outer circumferential wall of the cordless lower connector 220 is L3, and the L3 satisfies: 0.5 mm≤L3≤3 mm. Thus, when the implement part 100 is removed from the base part 200, it may not occur that the distance between the inner circumferential wall of the first supporting frame 160 and the outer circumferential wall of the cordless lower connector 220 is overlarge such that a child may put his finger therein, causing an electric shock accident, so as to improve safety of the cordless liquid heating device.

Further, the L2 and L3 satisfies: 0≤L3/L2≤3.75. The cordless lower signal-transmission connector 230 is fitted with the cordless upper signal-transmission connector 130. Accordingly, the greater a value of the L2 is, the greater a value of the corresponding L3 is; and the smaller the L3 is, the smaller the corresponding L2 has to be. The inventor obtains the above relation of the L2 and the L3 through several tests.

A distance between a top point of a portion of the fourth conductive part 232 placed between the inner circumferential wall of the first supporting frame 160 and the outer circumferential wall of the cordless lower connector 220 and an upper end surface of the first supporting frame 160 is L4, a distance between a top point of a portion of the third conductive part 231 placed between the inner circumferential wall of the first supporting frame 160 and the outer circumferential wall of the cordless lower connector 220 and the upper end surface of the first supporting frame 160 is L5, and the L4 satisfies: L4≥3 mm, the L5 satisfies: L5≥3 mm.

Since a power cord is normally in communication with the base part 200 after assembling of the base part 200 is completed, if a water drop is present on the base part 220, the water drop may enter between the inner circumferential wall of the first supporting frame 160 and the outer circumferential wall of the cordless lower connector, such that the third conductive part 231 and the fourth conductive part 232 can be in communication with the surrounding, thereby causing the electric shock accident. A diameter of the water drop is generally 3 mm, the water drop can be effectively prevented from communicating the third conductive part 231 and the fourth conductive part 232 with the surrounding when the L4 and the L5 satisfy the above condition, thereby improving the safety performance of the cordless liquid heating device 1000.

Further, the L3 and L4 satisfies: 0≤L3/L4≤1, and the L3 and L5 satisfies: 0≤L3/L5≤1. In one embodiment, the L3 and L4 satisfies: 0.25≤L3/L4≤1, and the L3 and L5 satisfies: 0.25≤L3/L5≤1.

The smaller the L3 is, the more easily the water drop is hung between the inner circumferential wall of the first supporting frame 160 and the outer circumferential wall of the cordless lower connector, the water being not easy to drain, and then the larger the L4 and the L5 need to be, so as to prevent the water from communicating the first conductive part 231 and the second conductive part 232 with the surrounding. The inventor obtains the above relations of L3 and L4, as well as L3 and L5 through several tests.

Figure 10:
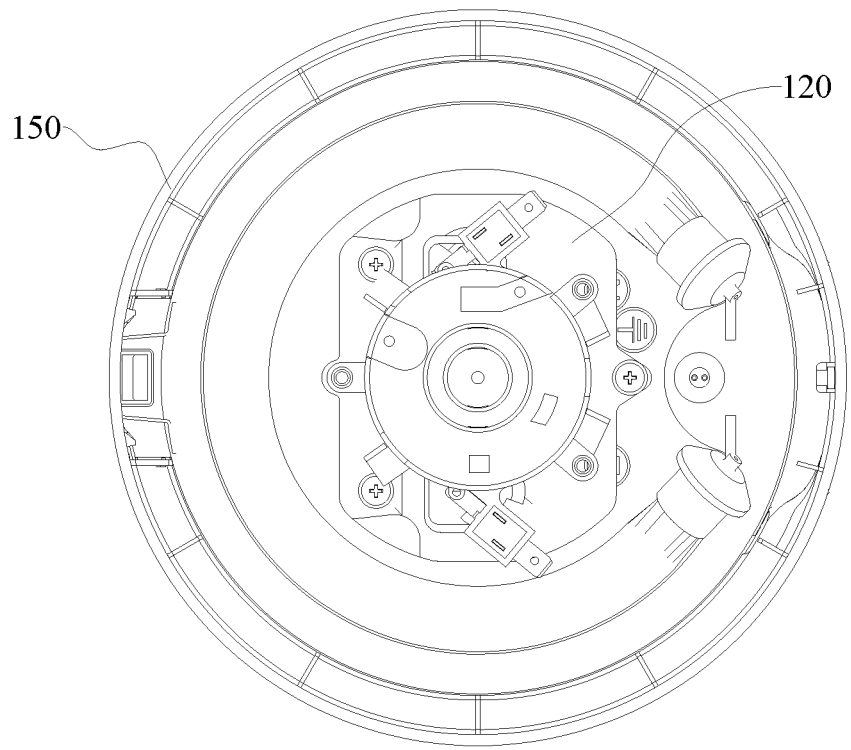
FIG. 10 is a schematic view of a cordless upper connector and a kettle body assembly according to an embodiment of the present invention, in which the cordless upper connector is fitted with the kettle body assembly.

In some embodiments of the present disclosure, as illustrated in FIGS. 10 and 11, the implement part 100 includes a kettle body assembly 150, and the cordless upper connector 120 is fixed to the kettle body assembly 150 by a threaded fastener. The kettle body bottom cover 150 can be fitted with the kettle body bottom cover 140 to combine the implement part 100 into a whole. The cordless upper signal-transmission connector 130 and the cordless upper connector 120 may approach each other or even abut against each other when the kettle body assembly 150 is fitted with the kettle body bottom cover 140.

Specifically, as illustrated in FIG. 9, a plurality of clearance notches is defined in the cordless upper connector 120, such that the first signal terminal 134, the second signal terminal and the snap can be avoided when the cordless upper signal-transmission connector 130 approaches the cordless upper connector 120.

Figure 17:
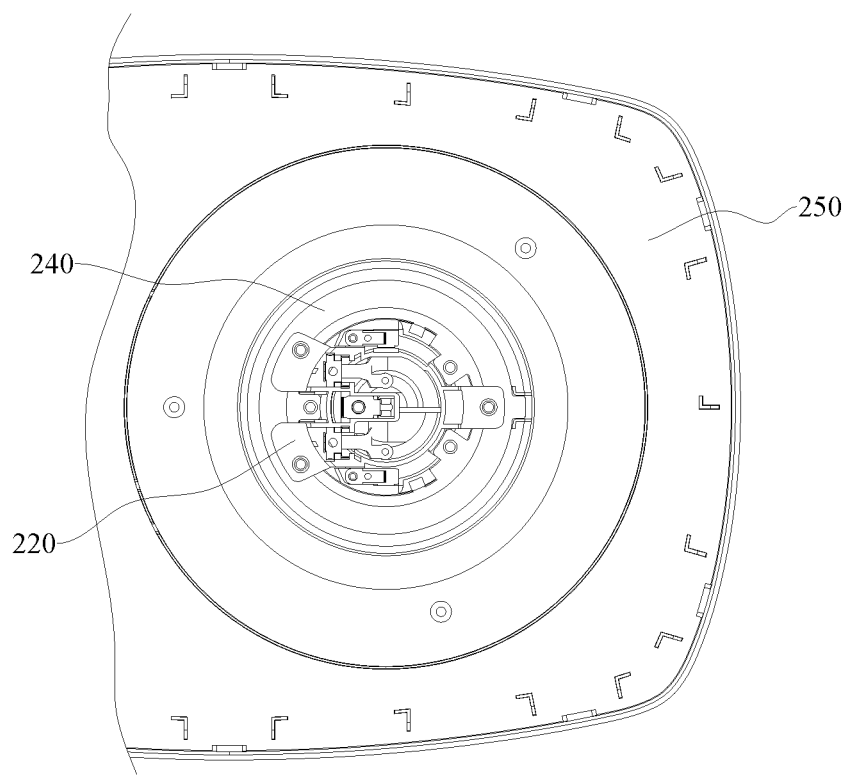
FIG. 17 is a schematic view of a cordless lower connector, a fixed seat and a base seat according to an embodiment of the present disclosure, in which the cordless lower connector, the fixed seat and the base seat are fitted.
Figure 18:
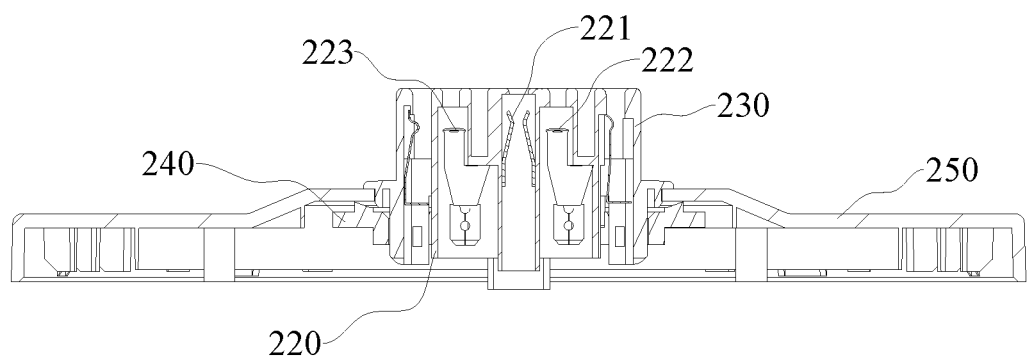
FIG. 18 is a sectional view of a cordless lower connector, a fixed seat and a base seat according to an embodiment of the present disclosure, in which the cordless lower connector, the fixed seat and the base seat are fitted.

More specifically, as illustrated in FIGS. 17 and 18, the cordless lower connector 220 is fixed on the base seat 250 through the fixed seat 240, and the cordless lower connector 220 can be fixed on the fixed seat 240 by the threaded fastener.

More specifically, the cordless upper connector 120 is electrically connected to the electric heater, after the implement part 100 is fitted with base part 200, the electric energy can be transmitted to the electric heater through the cordless upper connector 120, and the electric heater converts the electric energy to thermal energy, such that the liquid in the container can be heated.

The cordless upper signal-transmission connector 130 is electrically connected to the temperature measuring device 110, and after the temperature measuring device 110 has measured the temperature in the container, the temperature signal can be transmitted to the cordless upper signal-transmission connector 130.

The cordless upper connector 120 and the cordless upper signal-transmission connector 130 are separate components. That is to say, the transmission of the electric energy and the temperature signal is not achieved by the same component, and transmission paths of the electric energy and the temperature signal are separated.

The base part 200 includes a base, the cordless lower connector 220, the cordless lower signal-transmission connector 230 and the electronic control device (not illustrated), the cordless lower connector 220 and the cordless lower signal-transmission connector 230 are disposed to the base separately, and the cordless lower connector 220 and the cordless lower signal-transmission connector 230 are electrically connected to the electronic control device.

Additionally, the cordless lower connector 220 and the cordless lower signal-transmission connector 230 are separate components. That is to say, the transmission of the electric energy and the temperature signal is not achieved by the same component, and transmission paths of the electric energy and the temperature signal are separated.

The cordless upper connector 120 cooperates with the cordless upper connector 220 to transmit the electric energy to the implement part 100, and the cordless upper signal-transmission connector 130 cooperates with the cordless lower signal-transmission connector 230 to transmit the temperature signal measured by the temperature measuring device 110 to the electronic control device, when the implement part 100 is placed on the base part 200.

An operation process of the cordless liquid heating apparatus 1000 may be briefly described.

First, the implement part 100 is placed on the base part 200, in which case the cordless upper connector 120 cooperates with the cordless lower connector 220, and the cordless upper signal-transmission connector 130 cooperates with the cordless lower signal-transmission connector 230. The electric energy can be transmitted to the electric heater through the cordless lower connector 220 and the cordless upper connector 120, the electric energy is converted into the thermal energy by the electric heater, and the liquid in the container can be heated. During the heating process, the temperature measuring device 110 disposed to the liquid heating container can measure the temperature of the liquid in the container, and transmit the measured temperature signal to the electronic control device through the cordless upper signal-transmission connector 130 and the cordless lower signal-transmission connector 230. The electronic control device can operate in response to the measured temperature signal received. For example, when the temperature signal received by the electronic control device indicates that the temperature of the liquid in the container has reached a pre-set value, the electronic control device can control the electric heater to stop heating. When the temperature signal measured by the electronic control device indicates that the temperature of the liquid in the container does not reach a pre-set temperature value, the electronic control device can control the electric heater to continue heating.

In the cordless liquid heating apparatus 1000 according to embodiments of the present disclosure, the electric energy is transmitted from the base part 200 to the implement part 100 through the cordless upper connector 120 and the cordless lower connector 220, the temperature signal measured by the temperature measuring device 110 is transmitted to the electronic control device through the cordless upper signal-transmission connector 130 and the cordless lower signal-transmission connector 230, and the electronic control device operates in response to the signal received. The cordless upper connector 120 and the cordless upper signal-transmission connector 130 are separate components, and the cordless lower connector 220 and the cordless lower signal-transmission connector 230 are separate components, so that the transmission path of the electric energy and the transmission path of the signal are separated, and when one of the cordless upper electric connector 120, the cordless upper signal-transmission connector 130, the cordless lower connector 220, and the cordless lower signal-transmission connector 230 goes wrong, only the corresponding one needs to be maintained, thereby facilitating the maintenance of the cordless liquid heating apparatus 1000, and reducing the maintenance cost.

In some embodiments of the present disclosure, the implement part 100 further includes a power adjusting device connected to the electric heater. The power adjusting device can adjust power of the electric heater, reducing or increasing the power of the electric heater, so that the cordless liquid heating apparatus 1000 can adapt to a plurality of modes and various emergencies.

In one embodiment, the power adjusting device is a triac (triode AC semiconductor switch). Three ends of the triac are connected to the electronic control device, the electric heater and a live line respectively.

During operation, a user selects a liquid temperature to be reached, or simply sets the liquid to boil. The electronic control device then provides a signal to the triac so as to supply the electric energy to the electric heater, and the electric heater produces the thermal energy to heat the liquid in the container. When the liquid in the container reaches the pre-set temperature, the electronic control device controls the triac to interrupt the energy supply to the electric heater. When it is detected that there is no liquid in the container and the container is dry-heated, the triac can cut off the energy supply to the electric heater immediately.

According to some embodiments of the present disclosure, the implement part 200 further includes a user interface connected to the electronic control device. The user interface can make it convenient for the user to operate, and can provide selections of the plurality of modes, such as a boiling mode, a sterilization mode, and a custom mode. The user can select a needed mode according to practical requirements.

An outer circumferential wall of the cordless lower signal-transmission connector 230 is provided with a boss 234, and a bottom wall of the boss 234 abuts against a top wall of the base part 200 tightly when the implement part 100 is fitted with the base part 200. After the assembling is completed, there is no gap between the cordless lower signal-transmission connector 230 and the base part 200, such that the water is not easy to enter the base part 200, which is safer and more reliable.

A process of mounting the cordless lower signal-transmission connector to the base part may be briefly described below.

First, the cordless lower signal-transmission connector 230 is mounted downwardly to the base part 200 from above the base part 200, and the cordless lower connector 220 is then mounted upwardly to the cordless lower signal-transmission connector 230 from below the base part 200.

In some embodiments of the present disclosure, the cordless upper connector 120 includes three upper conductive parts, and the cordless lower connector 220 includes three lower conductive parts fitted with the three upper conductive parts in one-to-one correspondence.

Specifically, the three upper conductive parts of the cordless upper connector 120 are a columnar first fitting part 121, an annular second fitting part 122 and an annular third fitting part 123, and the three lower conductive parts of the cordless lower connector 220 are a through-hole-shaped fourth fitting part 221, a groove-shaped fifth fitting part 222 and a sixth fitting part 223. When the implement part 100 is placed on the base part 200, the columnar first fitting part 121 is inserted into the through hole and contacts an inner circumferential wall of the through-hole-shaped fourth fitting part 221, the annular second fitting part 122 is inserted into the groove-shaped fifth fitting part 222 and is fitted with the groove-shaped fifth fitting part 222, and the sixth fitting part 223 contacts an inner surface of the third fitting part 123. Thus, the electric energy can be transmitted to the liquid heating container through the cordless lower connector 220 and the cordless upper connector 120.

In one embodiment, as illustrated in FIG. 1, the fourth fitting part 221 consists of two elastic snap pieces opposite to each other, and the fifth fitting part 222 and the sixth fitting part 223 are configured as protrusion structures. When the implement part 100 is placed on the base part 200, the columnar first fitting part 121 extends into the two elastic snap pieces, the two elastic snap pieces abut against the first fitting part, and the annular second fitting part 122 and third fitting part 123 abut against tops of the protrusion structures respectively, so as to achieve the electric connection between cordless upper connector 120 and the cordless lower connector 220.

Thus, the implement part 100 can be rotated 360° relative to the base part 200 without influencing the electric connection of the cordless liquid heating device 1000.

Figure 21:
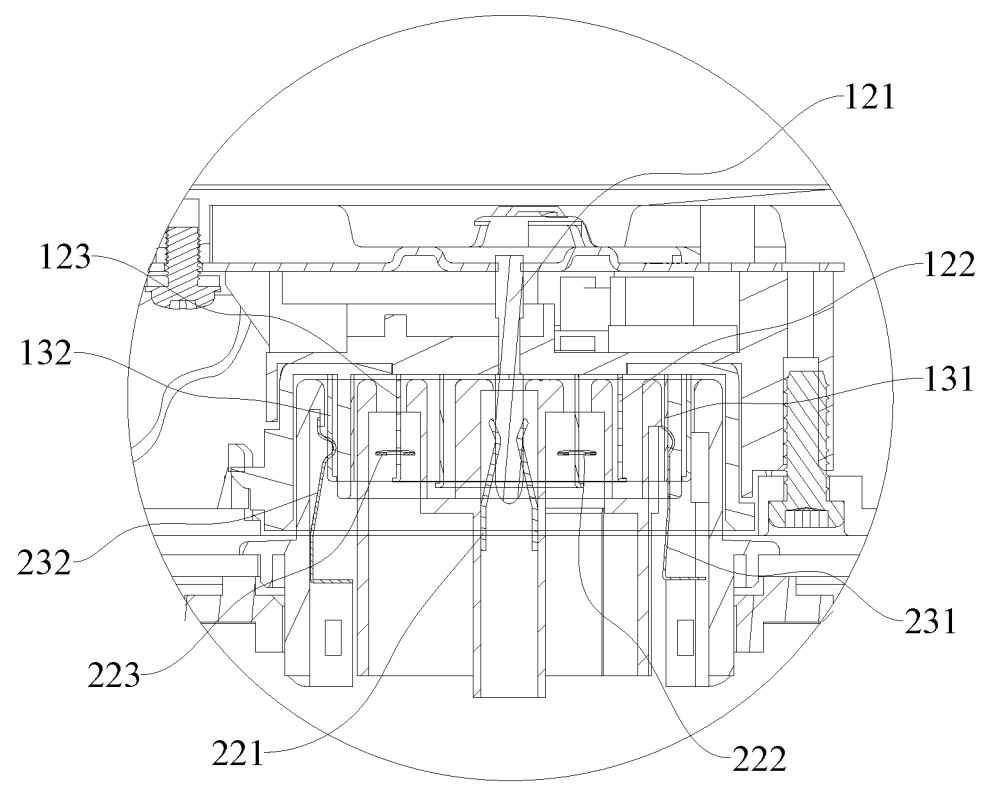
FIG. 21 is a partial sectional view of an implement part and a base part according to an embodiment of the present disclosure, in which the implement part is fitted with the base part.

As illustrated in FIGS. 20 and 21, the cordless lower connector 220 further includes a second supporting frame 260, the three lower conductive parts are disposed to the second supporting frame 260, a distance between a top surface of the fifth fitting part 222 and a top surface of the second supporting frame 260 is L6, a distance between a top surface of the sixth fitting part 223 and the top surface of the second supporting frame 260 is L7, and the L6 satisfies: L6≥3 mm, the L7 satisfies: L7≥3 mm.

Since the power cord is normally in communication with the base part 200 after assembling of the base part 200 is completed, if the water drop is present on the base part 223, the water drop may enter a space where the fifth fitting part 222 is and a space where the sixth fitting part 223 is, such that fifth fitting part 222 and the sixth fitting part 223 can be in communication with the surrounding, thereby causing the electric shock accident. A diameter of the water drop is generally 3 mm, the water drop can be effectively prevented from communicating the third conductive part 231 and the fourth conductive part 232 with the surrounding when the L4 and the L5 satisfy the above condition, thereby improving the safety performance of the cordless liquid heating device 1000.

It should be noted that, the outer circumferential wall of the cordless upper connector 220 mentioned above is an outer circumferential wall of the second supporting frame 260.

A height of a portion of the first protrusion part 231a in contact with the first conductive part 131 is greater than a height of the fifth fitting part 222 and a height of the sixth fitting part 223 separately, and a height of a lower end of the first conductive part 131 is neither less than a height of a lower end of the second fitting part 122 nor less than a height of a lower end of the third fitting part 123.

A height of a portion of the second protrusion part 232a in contact with the second conductive part 132 is greater than the height of the fifth fitting part 222 and the height of the sixth fitting part 223 separately, and a height of a lower end of the second conductive part 132 is neither less than the height of the lower end of the second fitting part 122 nor less than the height of the lower end of the third fitting part 123.

Additionally, in the process of placing the implement part 100 on the base part 200, contact between the second fitting part 122 and the fifth fitting part 222, and contact between the third fitting part 123 and the sixth fitting part 223 are prior to contact between the first conductive part 131 and the third conductive part 231, and contact between the second conductive part 132 and the fourth conductive part 232.

This design has the following advantage: the signal is a weak current, the power source is a strong current, and when the implement part 100 is fitted with the base part 200, the weak current first contacts, and the strong current contacts later. This design meets a circuit design requirement.

Certainly, it should be understood that, when the height of the portion of the first protrusion part 231a in contact with the first conductive part 131 is smaller than the height of the fifth fitting part 222 and the height of the sixth fitting part 223 separately, the height of the lower end of the first conductive part 131 can be smaller than the height of the lower end of the second fitting part 122 and the height of the lower end of the third fitting part 123 separately, and/or when the height of the portion of the second protrusion part 232a in contact with the second conductive part 132 is smaller than the height of the fifth fitting part 222 and the height of the sixth fitting part 223 separately, the height of the lower end of the second conductive part 132 can be smaller than the height of the lower end of the second fitting part 122 and the height of the lower end of the third fitting part 123 separately, so as to achieve this effect that the weak current first contacts and the strong current contacts later.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cordless liquid heating device, comprising:
   an implement part comprising a liquid heating container and a temperature measuring device, the liquid heating container comprising a container configured to contain liquid and an electric heater configured to heat the liquid;
   a base part configured to supply electric energy to the electric heater of the implement part through a cordless electric connector, the cordless electric connector achieving an electric connection when the implement part is placed on the base part regardless of a relative angle relation between the implement part and the base part, the base part comprising an electronic control device configured to control the electric heater; and
   a signal electric connection configured to transmit a temperature measured by the temperature measuring device to the electronic control device in the base part, so as to make the electronic control device operate in response to a measured value; the signal electric connection and the cordless electric connector that is configured to transmit the electric energy to the electric heater being separate components;
   wherein the signal electric connection comprising a cordless upper signal-transmission connector disposed to a bottom of the implement part and a cordless lower signal-transmission connector disposed to the base part, and the cordless upper signal-transmission connector and the cordless lower signal-transmission connector defining the signal electric connection;
   wherein the cordless upper signal-transmission connector comprises a first conductive part and a second conductive part; the temperature measuring device is electrically connected to the first conductive part and the second conductive part through a circuit separately; the cordless lower signal-transmission connector comprises a third conductive part fitted with the first conductive part and a fourth conductive part fitted with the second conductive part; the third conductive part abuts against the first conductive part, and the fourth conductive part abuts against the second conductive part, when the cordless upper signal-transmission connector is connected to the cordless lower signal-transmission connector;
   wherein the cordless electric connector configured to transmit the electric energy to the electric heater comprises a cordless upper connector disposed to the implement part, and a cordless lower connector disposed to the base part, the cordless upper connector and the cordless lower connector defining the cordless electric connector;
   wherein the cordless lower signal-transmission connector further comprises a first supporting frame, the third conductive part and the second conductive part are disposed to the first supporting frame separately, a distance between an inner circumferential wall of the first supporting frame and an outer circumferential wall of the cordless lower connector is L3, and the L3 satisfies: 0.5 mm≤L3≤3 mm.

2. The cordless liquid heating device according to claim 1, wherein the cordless upper signal-transmission connector is provided with a first signal terminal and a second signal terminal, the first signal terminal is connected to the temperature measuring device and the first conductive part separately, and the second signal terminal is connected to the temperature measuring device and the second conductive part separately.

3. The cordless liquid heating device according to claim 1, wherein the implement part further comprises a kettle body bottom cover, and the cordless upper signal-transmission connector is fixed on the kettle body bottom cover in a snap-fit manner.

4. The cordless liquid heating device according to claim 3, wherein one of the kettle body bottom cover and the cordless upper signal-transmission connector is provided with a snap, the other of the kettle body bottom cover and the cordless upper signal-transmission connector is provided with a snap groove, and the snap is fitted with the snap groove to fix the cordless upper signal-transmission connector on the kettle body bottom cover in the snap-fit manner.

5. The cordless liquid heating device according to claim 4, wherein the cordless lower signal-transmission connector includes a third signal terminal and a fourth signal terminal, the third signal terminal is connected to the third conductive part and the electronic control device separately, and the fourth signal terminal is connected to the fourth conductive part and the electronic control device separately.

6. The cordless liquid heating device according to claim 5, wherein the base part comprises a base seat and a fixed seat, and the cordless lower signal-transmission connector is fixed on the base seat through the fixed seat.

7. The cordless liquid heating device according to claim 6, wherein an insulating layer is provided between the first conductive part and the second conductive part, and a length of the insulating layer is greater than a length of the first conductive part and a length of the second conductive part, separately.

8. The cordless liquid heating device according to claim 7, wherein a minimum distance between the first conductive part and the second conductive part is L1, a thickness of the insulating layer is L2, and the L1 satisfies: L1≥3.6 mm, the L2 satisfies: L2≥0.8 mm.

9. The cordless liquid heating device according to claim 1, wherein the first conductive part is spaced apart from the second conductive part.

10. The cordless liquid heating device according to claim 1, wherein the third conductive part has a first protrusion part, and the fourth conductive part has a second protrusion part.

11. The cordless liquid heating device according to claim 8, wherein the L2 and L3 satisfies: 0≤L3/L2≤3.75.

12. The cordless liquid heating device according to claim 1, wherein a distance between a top point of a portion of the fourth conductive part placed between the inner circumferential wall of the first supporting frame and the outer circumferential wall of the cordless lower connector and an upper end surface of the first supporting frame is L4, a distance between a top point of a portion of the third conductive part placed between the inner circumferential wall of the first supporting frame and the outer circumferential wall of the cordless lower connector and the upper end surface of the first supporting frame is L5, and the L4 satisfies: L4≥3 mm, the L5 satisfies: L5≥3 mm.

13. The cordless liquid heating device according to claim 12, wherein the L3 and L4 satisfies: 0≤L3/L4≤1, and the L3 and L5 satisfies: 0≤L3/L5≤1.

14. The cordless liquid heating device according to claim 13, wherein the L3 and L4 satisfies: 0.25≤L3/L4≤1, and the L3 and L5 satisfies: 0.25≤L3/L5≤1.

15. The cordless liquid heating device according to claim 1, wherein the implement part comprises a kettle body assembly, and the cordless upper connector is fixed on the kettle body assembly by a threaded fastener.

16. The cordless liquid heating device according to claim 4, wherein a plurality of clearance notches is defined in the cordless upper connector, wherein a first signal terminal, a second signal terminal and the snap is avoided when the cordless upper signal-transmission connector approaches the cordless upper connector.

17. The cordless liquid heating device according to claim 6, wherein the cordless lower connector is fixed on the base seat through the fixed seat.

18. The cordless liquid heating device according to claim 1, wherein the electric heater is one or more of a heating tube and a thick film heater.

19. The cordless liquid heating device according to claim 1, wherein the implement part further comprises a power adjusting device connected to the electric heater.

20. The cordless liquid heating device according to claim 19, wherein the power adjusting device is a triac.

21. The cordless liquid heating device according to claim 1, wherein the implement part further comprises a user interface connected to the electronic control device.

22. The cordless liquid heating device according to claim 1, wherein an outer circumferential wall of the cordless lower signal-transmission connector is provided with a boss, and a bottom wall of the boss abuts against a top wall of the base part when the implement part is fitted with the base part.

23. The cordless liquid heating device according to claim 1, wherein the temperature measuring device is a thermal sensor.

24. The cordless liquid heating device according to claim 1, wherein the implement part is rotatable relative to the base part when the implement part is placed on the base part.

* * * * *